US007200984B2

United States Patent
Obregon et al.

(10) Patent No.: US 7,200,984 B2
(45) Date of Patent: Apr. 10, 2007

(54) CONSUMABLE STAPLE REFILL

(75) Inventors: Roberto Obregon, Guadalajara (MX); Marina M. Talavera, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 10/843,975

(22) Filed: May 11, 2004

(65) Prior Publication Data
US 2004/0206447 A1    Oct. 21, 2004

Related U.S. Application Data

(63) Continuation-in-part of application No. 09/975,452, filed on Oct. 11, 2001, now Pat. No. 6,736,922.

(51) Int. Cl.
*B32B 15/01* (2006.01)
*B32B 15/02* (2006.01)

(52) U.S. Cl. ............... 59/72; 59/77; 229/136; 156/247; 156/296

(58) Field of Classification Search ............... None
See application file for complete search history.

(56) References Cited

U.S. PATENT DOCUMENTS

| 2,383,135 | A | * | 8/1945 | Lang .................. 411/461 |
| 2,743,445 | A | * | 5/1956 | Hershey .............. 206/346 |
| 2,943,436 | A | | 7/1960 | Peterssen |
| 4,993,616 | A | | 2/1991 | Yoshie et al. |
| 6,548,135 | B1 | | 4/2003 | Hershey et al. |

* cited by examiner

*Primary Examiner*—Sam Chuan Yao

(57) ABSTRACT

The present invention is directed to a device and method for building a consumable refill that includes the steps of fabricating a plurality of arrays of detachably connected consumable parts along a first direction, stacking the arrays of detachably connected consumable parts along a second direction and bonding the stacked arrays of detachably connected consumable parts at an outer surface formed by one or more aligned marginal surfaces of the detachably connected consumable parts. In one embodiment, a staple refill includes a number of staple wire sheets stacked along a direction normal to a plane of each of the staple wire sheets. The staple wire sheets are bonded at an outer surface formed by one or more aligned marginal surfaces of the plurality of staple wires.

10 Claims, 4 Drawing Sheets

US 7,200,984 B2

CONSUMABLE STAPLE REFILL

RELATED APPLICATIONS

This continuation-in-part utility patent application claims the priority of a utility patent application entitled CONSUMABLE STAPLE REFILL filed Oct. 11, 2001, Ser. No. 09/975,452, now U.S. Pat. No. 6,736,922.

TECHNICAL FIELD

The present invention relates in general to the packaging of consumable products for use in machines and in particular to the packaging of fasteners used by office equipment.

BACKGROUND

Automated office devices, such as copiers, commonly employ machine components which perform helpful functions in addition to a main task, such as, for instance, automatically stapling a number of copied sheets together. Accordingly, the provision of economical, reliable, and efficient mechanisms for performing such subsidiary functions, and of consumable components used by such mechanisms, is generally desirable in order to provide a beneficial service to the machine as a whole. One such mechanism is an automatic stapler.

One prior art approach to providing staples in a manner suitable for automatic stapling within a copy machine, or copier, is the insertion of a container of staples which is placed within the copier so as to make the individual staples available to automatic stapling equipment within the copier. Generally, upon consuming all the staples within a container, the container is removed and disposed of. The discarding of used staple containers in this manner generally causes the expense associated with the production and disposal of one staple container to be incurred every time one container's worth of staples is consumed by the copier. Moreover, an environmental cost is experienced, since a considerable number of containers will either be discarded completely, or recycled, over the operating life of a copy machine.

An alternative approach involves using sheets of staple wire which are stacked and bound using a paper tie. Ideally, a human operator first securely inserts the bound stack of staple wire sheets into a copier and then removes the paper tie to allow the sheets to be moved with respect to each other within the copier to enable automatic stapling to occur. However, this approach is subject to a human operator occasionally forgetting to remove the paper tie, thereby disabling the advancement of staple wire sheets for automatic stapling. Another problem experienced with this approach is that some human operators elect to remove the paper tie prior to inserting the vertically stacked staple wire sheets into a copier which may cause the sheets to fall into disarray. Thereafter, it can be quite difficult to reorder the sheets so as to properly position and secure them within a copy machine staple refill container.

Additionally, the ties used to bind staple wire sheets together may disable operation of an automatic stapling operation if not properly removed from a copy machine prior to initiating operation thereof.

Additionally, prematurely removing a tie binding staple wire sheets together may hinder the proper placement of such staple wire sheets in a copy machine.

SUMMARY OF THE INVENTION

The present invention is directed to a method for building a consumable refill that includes the steps of fabricating a plurality of arrays of detachably connected consumable parts along a first direction, stacking the plurality of arrays of detachably connected consumable parts along a second direction and bonding the stacked plurality of arrays of detachably connected consumable parts at an outer surface formed by one or more aligned marginal surfaces of the detachably connected consumable parts. In one embodiment, a staple refill includes a plurality of staple wire sheets, each of the plurality of staple wire sheets including a plurality of detachably connected staple wires, the staple wire sheets stacked along a direction normal to a plane of each of the staple wire sheets. The plurality of staple wire sheets are bonded at an outer surface formed by one or more aligned marginal surfaces of the staple wires. Alternatively, or in addition, the plurality of staple wire sheets may be bonded at their respective interfacing surfaces.

DETAILED DESCRIPTION

Figure 1:
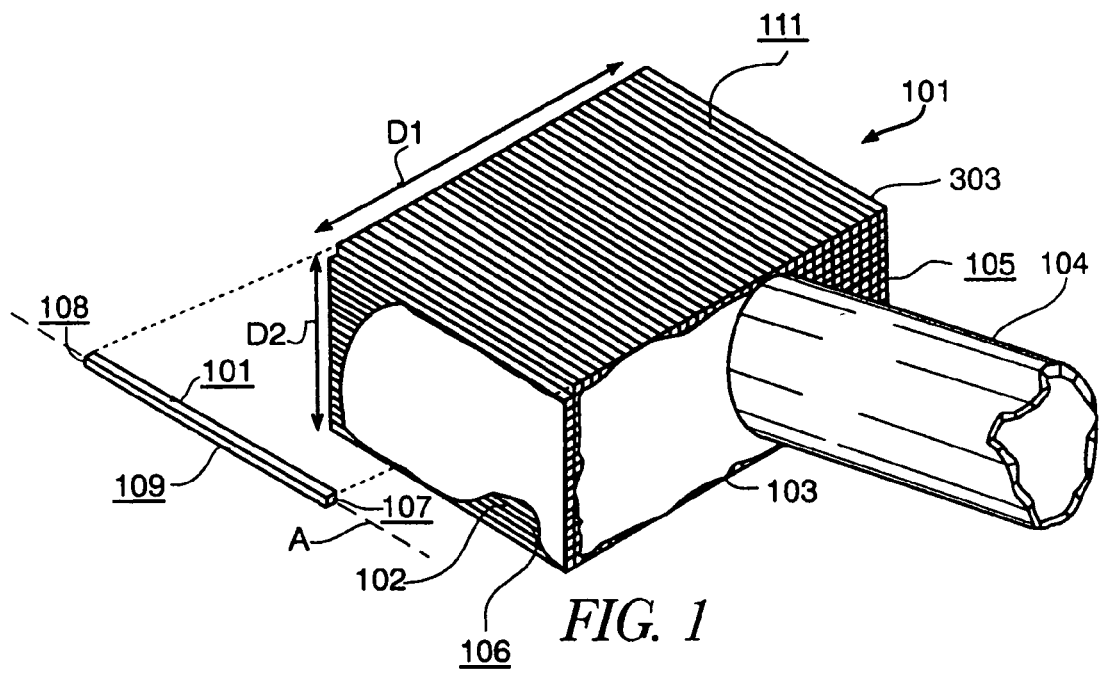
FIG. 1 is an isometric view of the application of an adhesive to an outer surface of a staple refill according to one embodiment of the present invention.

The present invention is directed to a system and method for providing a waste-free refill of consumable parts for use within a machine. When providing a staple wire refill for a copy machine, the inventive approach involves inserting a package of staple wires bound together by a mechanism, such as a fastener, which is preferably entirely consumed in the stapling process, thereby obviating a need to remove waste material, such as a disposable staple container, from such copy machine subsequent to insertion of such a refill. In a preferred embodiment, a staple refill or package is mechanically bonded together along a first dimension, such as through the use of a preferably brittle glue or a perforated metal connection, and bonded along a second dimension through the use of glue or other adhesive. Preferably, the glue or other adhesive used is consumed and/or expelled from the copy machine during the stapling process so as to avoid having to perform any material removal from such copy machine or other device.

In a preferred embodiment, a plurality of sheets of staple wires, or staple wire sheets, are stacked vertically, horizontally, or in yet another orientation. Preferably, each sheet within such stack is bonded along one or more marginal edges of the staple wire sheets. Preferably, the staple wires within each staple wire sheet are bonded to each other using brittle glue.

In a preferred embodiment, bonding along a second dimension would involve bonding staple wire sheets together, after production of such sheets, using glue or other adhesive which is either consumed and/or expelled from a copy machine or other host device as a consequence of the stapling process. Elimination of the glue or other adhesive residue from a copy machine stapling mechanism may occur by fragmenting the glue during each stapling operation and then expelling the fragmented glue residue from the stapling mechanism onto the paper or other media being stapled. Alternatively, heat could be employed to burn off the adhesive such that no expulsion of glue from the host device is needed. Alternatively, glue removed from the staples could be directed into a waste container which is periodically emptied by an operator. Moreover, a combination of physical fragmentation, heat, and material removal could be employed, and all such variations are intended to be included within the scope of the present invention.

In a preferred embodiment, adhesive used for bonding the staple wire sheets together is strong enough to hold the sheets together while being manually handled, during placement into a stapling mechanism, and for a period leading up to consumption of staple wires within a refill or package of staple wires. Furthermore, the same adhesive is preferably weak enough to allow the sheets to readily separate once appropriate separation force is applied to one sheet of a refill, the remainder of the refill, or both a sheet and a remainder of the refill at once. Such separating force is preferably applied in order to advance the wires within a selected sheet toward a stamping mechanism for adhering individual staples to paper or other appropriate media.

While the above discussion has primarily been directed to the use of the inventive consumable part bonding mechanism in conjunction with automatic copy machines, it will be appreciated that other office equipment such as fax machines and scanners may also be used in conjunction with the present invention. Moreover, manually operated devices as well as automatic devices may employ the inventive part bonding mechanism, and all such variations are included within the scope of the present invention. The inventive mechanism is not limited to bonding staples together but may be applied to paper clips, pins, and any other consumable parts formed into stacks or packages which store parts employing a repetitive pattern of closely spaced parts configured for use in a consuming device such as a stapler.

Therefore, it is an advantage of a preferred embodiment of the present invention that stacked staple wire sheets are sufficiently strongly bonded together so as to prevent separation of such sheets prior to activation of an appropriate advancement mechanism within a staple machine.

It is a further advantage of a preferred embodiment of the present invention that human operator intervention is generally not needed for the purpose of material removal after a staple wire refill has been inserted into a staple machine.

It is a still further advantage of a preferred embodiment of the present invention that any residue from material used to bond together components of a staple wire refill is either consumed or expelled from a copy machine or other host device through normal operation of the stapling mechanism of such host device.

Referring to FIGS. 1–5, staple refill 303 is shown including a plurality of staple wire sheets 102. Referring to FIG. 1, each staple wire sheet 102 includes a plurality of detachably connected consumable parts connected along a first direction D1. As seen in FIG. 1, the plurality of detachably connected consumable parts, in this case, includes a plurality of staple wires 101 detachably connected to each other along a direction parallel to a longitudinal axis A of each wire 101 forming an array. Each staple wire 101 includes first and second ends 107 and 108 respectively and a marginal side 109. A plurality of arrays of detachably connected consumable parts, in this case, a plurality of staple wire sheets 102 are stacked along second direction D2 forming staple refill 303, shown including a substantially cube-shaped structure.

FIG. 1 shows adhesive 103 being applied to outer surfaces 105 and 106 of staple refill 303 by means of applicator 104. Outer surface 105 is formed by the aligned terminal ends 108 of each staple wire 101. Outer surface 106 is formed by the alignment of marginal side 109 of each staple wire 101. An adhesive may also be applied to an outer surface on a side opposing outer surface 105 of staple refill 303, (not shown) formed by the aligned terminal ends 107 of each staple wire 101. An adhesive may also be applied to an outer surface opposing surface 106, (not shown), and to an outer surface 111 and/or an outer surface opposing surface 111, (not shown). Staple wire sheets 102 are glued at outer surfaces 105 and/or 106 and/or their respective opposing outer surfaces, (not shown), to provide mechanical integrity to such staple refill 303 during handling of staple refill 303. The strength of adhesion applied to the various outer surfaces 105, 106, 111 and/or their respective opposing outer surfaces, (not shown), is selected so as to be strong enough to prevent staple wire sheets 102 from being unintentionally separated from the remainder of staple refill 303 during manual handling, but weak enough to permit separation of one staple wire sheets 102 from a remainder of staple refill 303 by an appropriate advancement mechanism without deforming a remainder of staple refill 303. One commercially available adhesive which has been found effective for this purpose is PRITT® glue, provided in solid, "rub-on" form, and available from HENKEL®. However, other types of solid stick rub-on glue may be employed, and all such variations are intended to be included within the scope of the present invention.

It will be appreciated that the present invention could be practiced employing a range of different adhesive mechanisms including various brands of solid, liquid or aerosol glues. Moreover, attachment means other than glue, including mechanical clips, mechanical clamps, as well as electrical, magnetic, and/or electromechanical mechanisms could be employed to provide a fully consumable refill of staple wires or other package of consumable parts, so long as the binding mechanism is consumed or expelled during operation of the consuming machine.

Applicator 104 is shown being moved across outer surface 105 of staple refill 303 so as to provide a quantity of adhesive which will provide a bond strong enough to preserve the mechanical integrity of a fully constructed staple refill 303. Full coverage of outer surfaces 105, 106, 111 and/or their respective opposing outer surfaces, (not shown), may not be needed depending upon the strength of deposited adhesive 103. For strong adhesives, partial coverage of outer surfaces 105, 106, 111 and/or their respective opposing outer surfaces, (not shown), may suffice. For weaker adhesives, complete coverage of outer surfaces 105,106, 111 and/or their respective opposing surfaces, (not shown), may be desirable. In a preferred embodiment, the application of adhesive to outer surfaces 105, 106, 111 and/or their respective opposing outer surfaces, (not shown), may be automated in order to supply adhesive material in a more rapid, more consistent, and more cost effective manner.

Preferably, the connection between wires forming staple wire sheet 102 is established during manufacture of staple wire sheet 102 and consists of individual wires bonded to adjacent wires by means of a preferably brittle glue. Preferably, the connection formed by the brittle glue is easily ruptured when removal of individual staple wires is desired, without inflicting any damage upon staples remaining within staple wire sheet 102.

For example, where staple wires are removed from staple wire sheet 102 by stamping or forming a wire located at a leading edge of staple wire sheet 102 into a "U"-shaped staple, and simultaneously, or soon thereafter, affixing such formed staple to paper or other media, such forming or stamping is preferably completed without damaging or distorting the shape of a remainder of staple wire sheet 102. Additionally, or alternatively to employing glue to provide a detachable connection between individual staple wires connected to form staple wire sheet 102, perforations may be employed along a connecting edge between adjacent wires within staple wire sheet 102, and all such variations are intended to be included within the scope of the present invention.

Referring to FIGS. 2–6, staple refill 303 may be inserted into a staple machine or other host device, in order to adequately provision such host device for a substantial number of stapling operations. The effective deployment of staple refill 303 preferably involves providing a package of staples which can be handled by a human operator, placed in a stapling machine or other host device, and processed in such host device while maintaining the mechanical integrity of the cube structure, or other geometric form of staple refill 303, until a stapling operation requires the removal of one staple wire from a staple wire sheet 102 and/or the separation of one staple wire sheet 102 from the staple refill 303 as a whole.

Figure 2:
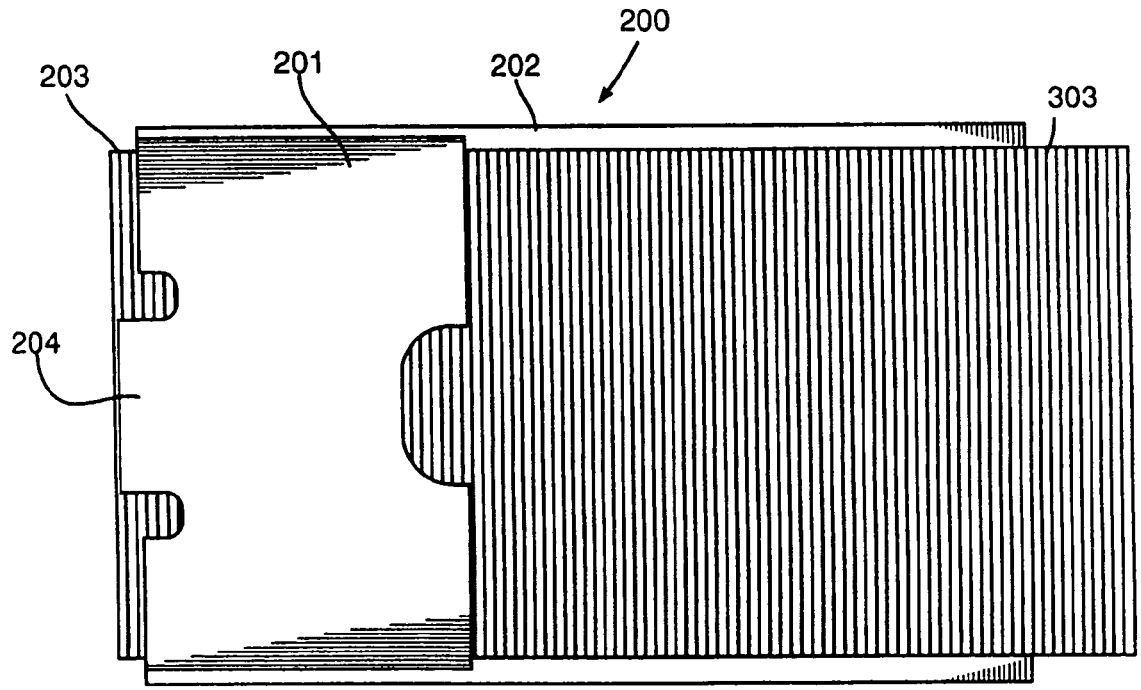
FIG. 2 is a bottom view of a staple refill placed in a staple cartridge according to one embodiment of the present invention.

FIG. 2 shows staple refill 303 disposed within cartridge 200 of a staple machine or other host device. Forming plate 201 is shown on the left portion of the FIGURE. Section 202 is preferably a structural component of cartridge 200.

In a preferred embodiment, wire 203 of the bottom sheet of staple refill 303 is substantially aligned with narrowed portion 204 of forming plate 201. During each stapling cycle, a forming tool, (not shown), is moved towards staple 203 and narrow portion 204 of forming plate 201. Proper engagement of the forming tool with forming plate 201 preferably causes staple 203 to be formed into a "U" shape in preparation for the insertion of the newly formed staple into paper or other appropriate media. In this manner, staple 203 is preferably detached from the bottom staple layer or sheet of staple refill 303, by the operation of the forming tool (not shown), without significantly disturbing a remainder of staple refill 303.

Figure 3:
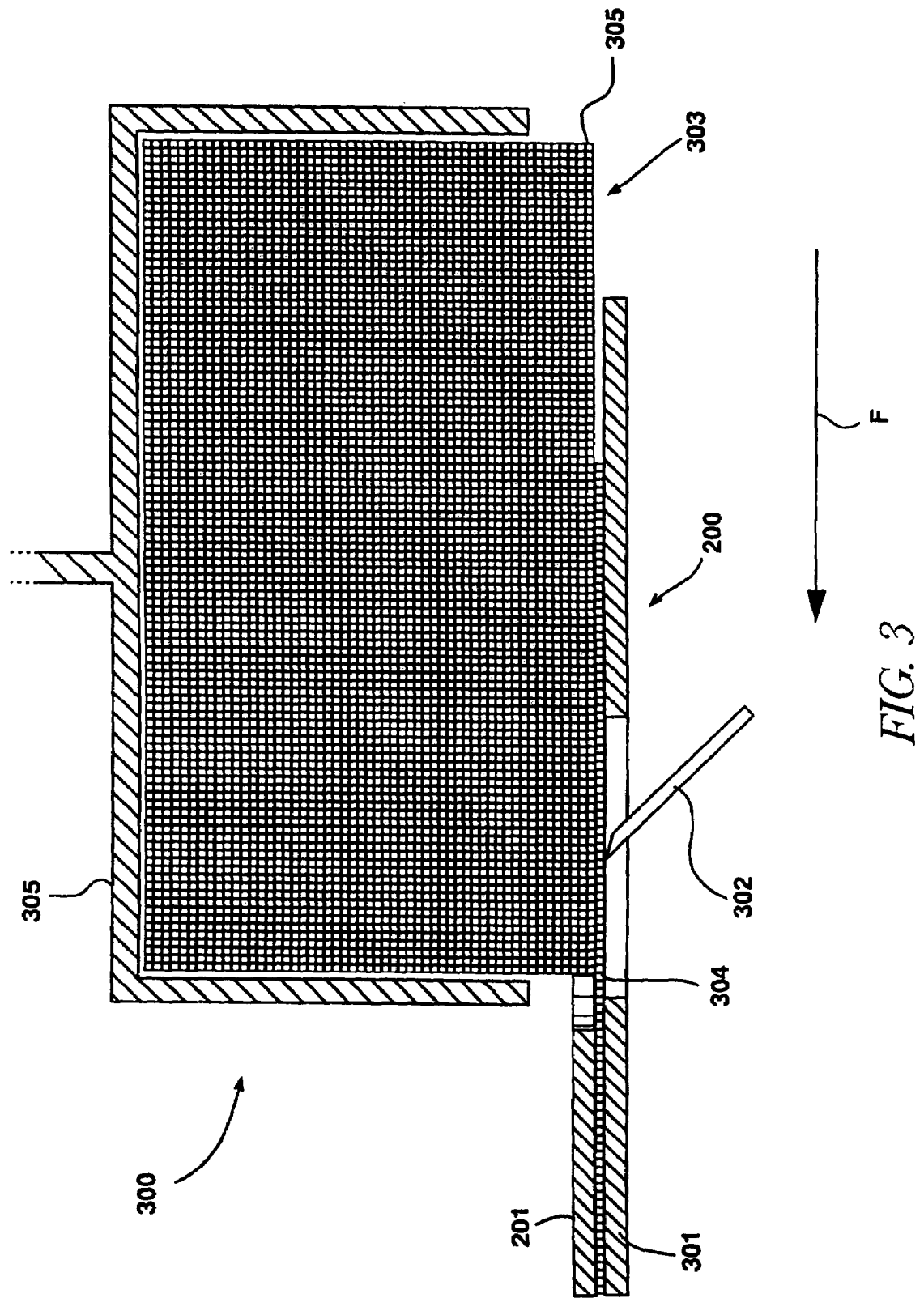
FIG. 3 is a cut-away view of the advancement of the lowest sheet of a staple refill by an advancement mechanism according to one embodiment of the present invention.

FIG. 3 presents a side view 300 of staple refill 303 placed on cartridge 200 according to a preferred embodiment of the present invention. Blade 302 preferably operates to apply separation force F to advance staple wire sheet 304 by a measured amount for each stapling cycle, thereby pushing an end of staple wire sheet 304 in between forming plate 201 and guiding plate 301. The advancement of staple wire sheet 304 preferably continues until all staples within staple wire sheet 304 have been formed and driven into paper or other media. At that point, staple wire sheet 305 adjacent staple wire sheet 304, within staple refill 303, is preferably advanced towards forming plate 201 and guiding plate 301 as discussed above for staple wire sheet 304. In a preferred embodiment, case 305 operates to restrain the movement of staple refill 303 during operation of blade 302 for the purpose of advancing staple wire sheet 304.

Figure 4:
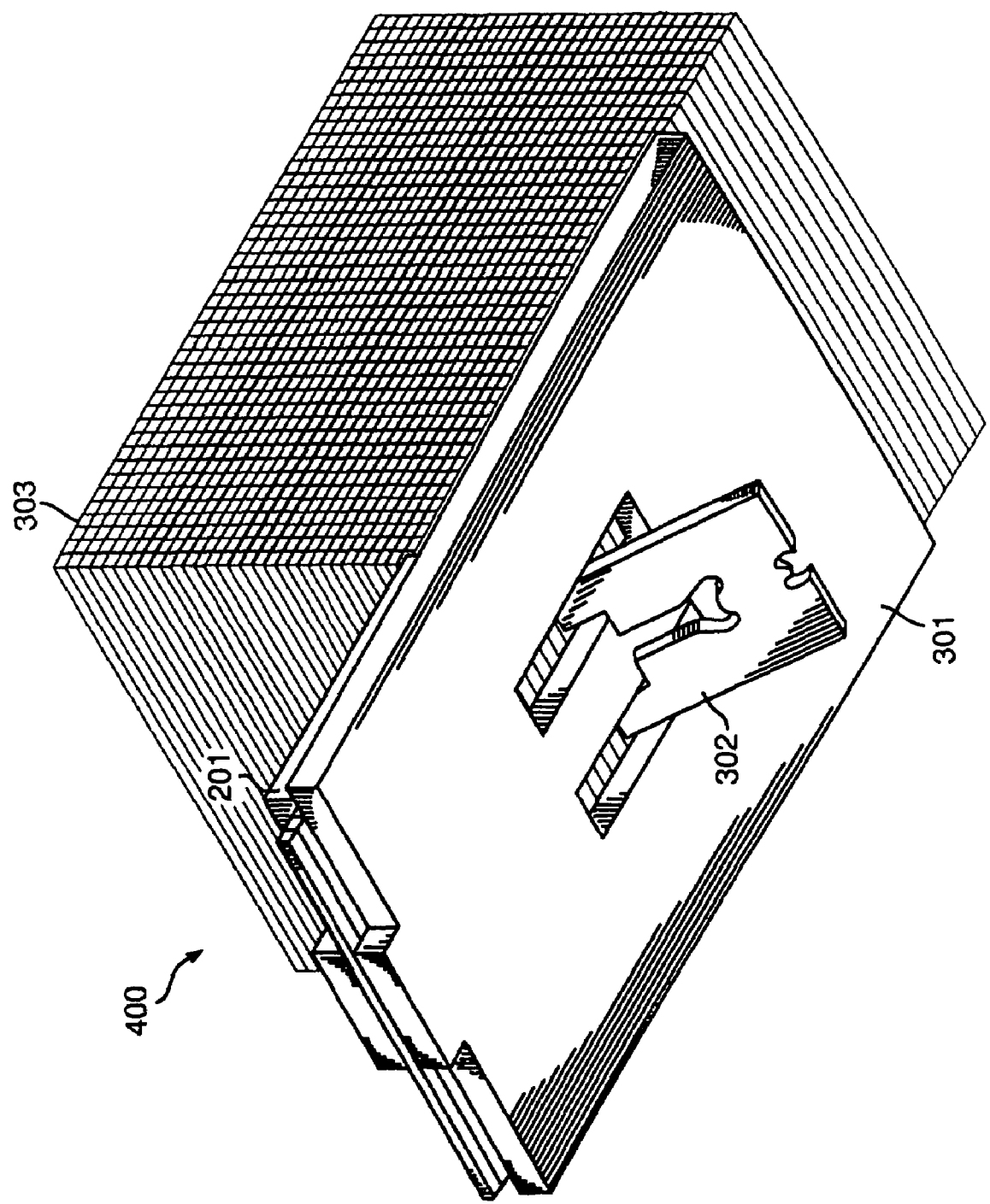
FIG. 4 is an isometric view of the bottom of a staple refill coupled to an advancement mechanism according to one embodiment of the present invention.
Figure 5:
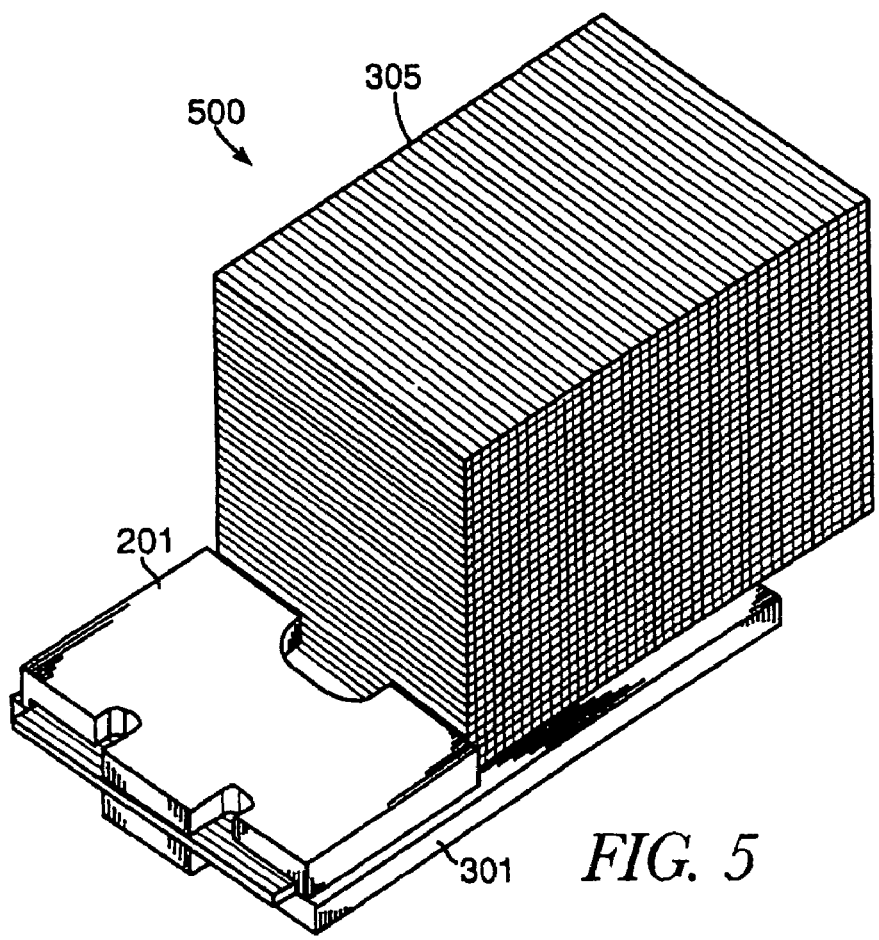
FIG. 5 is an isometric view of the top of a staple refill coupled to an advancement mechanism according to one embodiment of the present invention.

FIG. 4 depicts an isometric view 400 of staple refill 303 positioned in cartridge 200 of a staple machine or other host device. FIG. 5 depicts an isometric view 500, from above, of the staple machine or other host device shown in FIG. 3.

Figure 6:
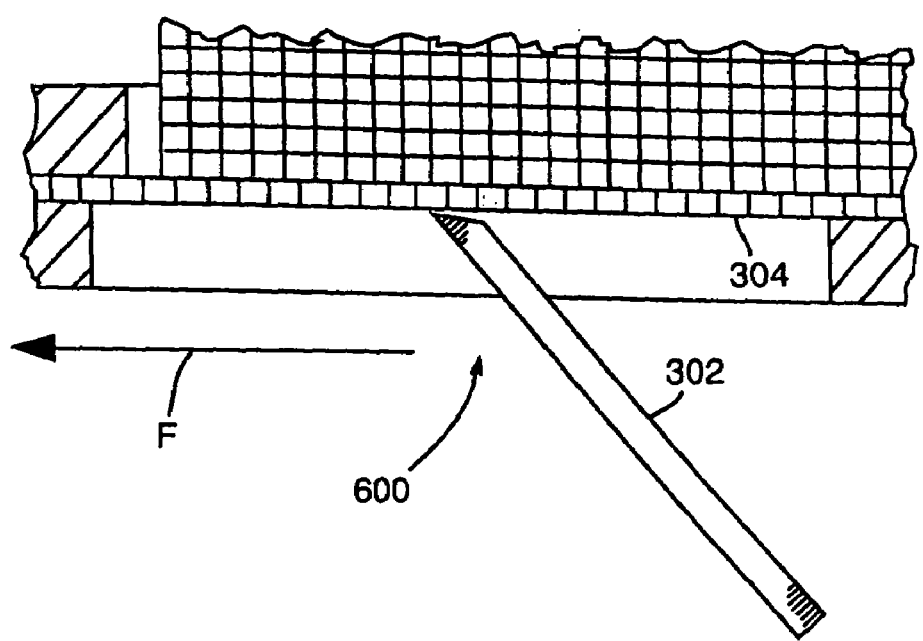
FIG. 6 is a close up cut-away view of the advancement of the lowest sheet of a staple refill according to one embodiment of the present invention.

FIG. 6 is a close up view 600 of the subject matter of FIG. 3. It may be observed that in a preferred embodiment of the invention, when blade 302 moves to one side, for example toward the left, the angle of attack of blade 302 with respect to lowest staple wire sheet 304 is such as to impart separation force F to break the adhesive bond formed between staple wire sheet 304 and the immediately adjacent staple wire sheet 305. Blade 302 thereby preferably causes staple wire sheet 304 to move to one side, for example, to the left, with the movement of blade 302. However, when blade 302 is moved to the other side, for example to the right, the angle of attack is such as to impart very little if any force to blade 302.

It will be evident that there are additional embodiments and applications which are not disclosed in the detailed description but which clearly fall within the scope of the present invention. The specification is, therefore, intended not to be limiting, and the scope of the invention is to be limited only by the following claims.

What is claimed is:

1. A staple refill, comprising:
   a plurality of staple wire sheets stacked along a direction normal to a plane of each of the plurality of staple wire sheets,
   each of the plurality of staple wire sheets including a plurality of staple wires detachably connected to each other along a direction parallel to a longitudinal axis of each staple wire, and
   each of the plurality of staple wire sheets bonded together at a first outer surface formed by aligned terminal ends of the staple wires and at a second outer surface formed by aligned marginal sides of the staple wires, the second outer surface perpendicular to the first outer surface.

2. The staple refill of claim 1 wherein the plurality of staple wires are bonded together along a first dimension with a brittle glue.

3. The staple refill of claim 1 wherein the plurality of staple wires are bonded together along a first dimension with a perforated metal connection.

4. The staple refill of claim 1 wherein the plurality of staple wire sheets are bonded together at the first outer surface with an adhesive.

5. The staple refill of claim 1 wherein the plurality of staple wire sheets are bonded together by a bonding force having a strength sufficient to allow separation of a staple wire sheet from a remainder of said refill only upon application of a separation force from an array advancement mechanism.

6. The staple refill of claim 5 wherein the plurality of staple wire sheets are sufficiently bonded together so as to prevent separation of the staple wire sheets prior to application of the separation force from the array advancement mechanism.

7. The staple refill of claim 1 wherein the plurality of staple wire sheets are bonded together at the second outer surface with an adhesive.

8. The staple refill of claim 1 wherein the plurality of staple wire sheets are separated by at least one of fragmentation, heat, and removal of bonding material.

9. The staple refill of claim 2 wherein the first dimension is parallel to the longitudinal axis of each staple wire.

10. The staple refill of claim 3 wherein the first dimension is parallel to the longitudinal axis of each staple wire.

* * * * *